United States Patent [19]

Giacomelli

[11] Patent Number: 5,713,181
[45] Date of Patent: Feb. 3, 1998

[54] CARTON BOTTOM SEAL

[75] Inventor: Peter Giacomelli, Buffalo Grove, Ill.

[73] Assignee: Tetra Laval Holdings & Finance S.A., Pully, Switzerland

[21] Appl. No.: 317,503

[22] Filed: Oct. 4, 1994

[51] Int. Cl.$^6$ .................................................. B65B 51/10
[52] U.S. Cl. .................... 53/371.2; 53/374.2; 493/209
[58] Field of Search ......................... 53/374.2, 377.2, 53/376.6, 376.8, 371.2, 341; 156/581; 493/165, 207, 209

[56] References Cited

U.S. PATENT DOCUMENTS

| | | |
|---|---|---|
| 3,468,731 | 9/1969 | Obeda . |
| 4,251,303 | 2/1981 | Deinel et al. ............... 53/374.2 |
| 4,279,675 | 7/1981 | Braun . |
| 4,403,465 | 9/1983 | Bachner ..................... 156/581 |
| 4,518,377 | 5/1985 | Skinner . |
| 4,603,535 | 8/1986 | Schultheis ................. 53/374.2 |
| 4,860,902 | 8/1989 | Kieser . |
| 5,083,702 | 1/1992 | Wyberg . |
| 5,135,463 | 8/1992 | Hyduk . |
| 5,214,905 | 6/1993 | Wyberg ..................... 53/477 |
| 5,255,494 | 10/1993 | Doylew . |
| 5,285,955 | 2/1994 | Mosse . |
| 5,321,930 | 6/1994 | Poole ....................... 53/371.2 |

*Primary Examiner*—Lowell A. Larson
*Assistant Examiner*—Gene Kim
*Attorney, Agent, or Firm*—Michael A. Catania

[57] ABSTRACT

A gabled carton is set forth that is comprised of a top gabled portion, a bottom gabled portion and a bottom fin extending from the bottom gabled portion. The bottom fin has a distal seal extending lengthwise along the bottom fin at a location between the bottom gabled portion and an outer edge. There is also a proximal seal on the bottom fin and it extends lengthwise along the bottom fin at a location between the bottom gabled portion and the distal seal. There is a relieved area on a central portion of the proximal seal. Both of the seals extend lengthwise along the entire length of the bottom fin. The proximal seal is shallower than the distal seal. The relieved area extends above and below the proximal seal and is centered on it.

2 Claims, 2 Drawing Sheets

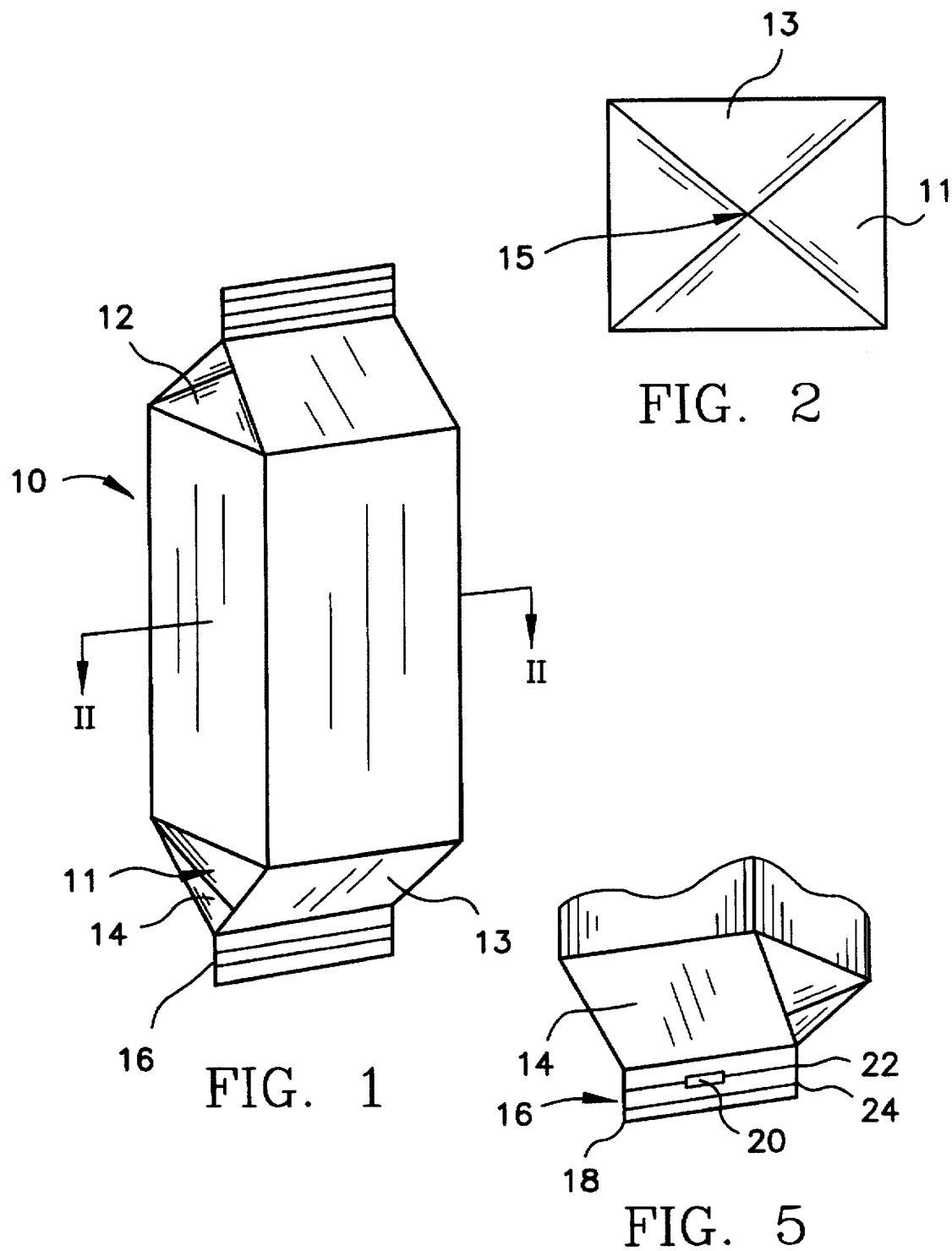

CARTON BOTTOM SEAL

TECHNICAL FIELD

The present invention relates to the sealing of a bottom fin of a gable top container. Specifically, the present invention relates to the sealing of the bottom fin and having a relieved area on a seal to prevent leakage due to extreme pressure which would cause breakage of the paperboard.

BACKGROUND

Gable top cartons have been known for the better part of the twentieth century. Their characteristic simplicity and resealability have helped to sustain their popularity as containers for traditional liquid food products such as milk and juice, but in recent years they have been used for products ranging from ammunition to Epsom salts. Gable top cartons typically start out as generally rectangular carton blanks made of laminated paperboard or similar material. The carton blanks are provided with a number of creases to facilitate folding and forming the blank into a carton.

During decades of development, manufacturers of packaging machines have devised a variety of ways to form, fill, and seal gable top cartons. Today, the most prevalent packaging machines for gable top cartons are adapted to receive the carton blank after it has been side sealed. The process of side sealing involves sealing opposite vertical edges of the carton blank together to form a polygonal (usually rectangular) sleeve. The sleeve is received on an indexable mandrel wheel, which rotates the sleeve into respective positions where the end of the sleeve extending outwardly from the mandrel is folded and sealed to form the bottom of the carton.

After the carton bottom has been formed, the carton is then removed from the mandrel and transported to a filling station, where the carton is filled with product. Once the carton has been filled, the top of the carton is folded and sealed into the familiar gable top configuration, thus completing the packaging process. One example of a known packaging machine that operates generally in accordance with these principles is described in U.S. Pat. No. 3,789,746 to Martensson et al.

Although most gable top cartons appear to be substantially identical, materials and processes vary significantly from manufacturer to manufacturer. One of the differences is in the way the bottom seal on the carton bottom is achieved. Traditionally, after the carton sleeve is formed the portion that creates the bottom of the carton includes four flaps. Two minor flaps that are opposite each other are creased to fold inwardly to each other. As the minor flaps are folded in, the opposing major flaps fold toward one another and overlap to form a flat bottom seal. In an alternative carton bottom seal, as the minor flaps are folded in, the major flaps fold toward one another to form a bottom fin, which is subsequently folded over and sealed to the carton bottom. Bottom seals of this type are described generally copending application Ser. No. 08/238,923 filed on Jul. 7, 1994. Due to the nature of the sealing process, when this bottom fin is folded over a relatively high amount of stress is created in the center of the package bottom. Frequently, the seal will break and allow leakage of the product. For example, the product (such as milk or orange juice) may begin "wicking" through the paperboard substrate of the bottom fin. Such wicking may compromise the seal of the bottom fin over the shelf life of the product. Further, the accumulation of the product along the bottom fin may be repulsive to the consumer as the carton sits on the store shelf or in the consumers refrigerator.

SUMMARY OF THE INVENTION

A gabled carton is set forth that includes a top gabled portion, a bottom gabled portion and a bottom fin extending from the bottom gabled portion. The bottom fin has a distal seal extending lengthwise along the bottom fin at a location between the bottom gabled portion and an outer edge. There is also a proximal seal on the bottom fin that extends lengthwise along the bottom fin at a location between the bottom gabled portion and the distal seal. A relieved area is located on a central portion of the proximal seal. Both of the seals can extend lengthwise along the entire length of the bottom fin. The proximal seal can be provided that is shallower than the distal seal. The relieved area may extend above and below the proximal seal and be centered on the proximal seal.

A device for sealing the bottom fin of the container includes a first jaw having a generally planar surface and a second jaw having a generally planar surface disposed opposite the first jaw. The second jaw has a plurality of ridges protruding lengthwise and generally parallel to one another from the planar surface of the second jaw. A recessed area is provided on a central portion of one the ridges on the second jaw. The plurality of ridges may include a first ridge adapted to form a distal seal and a second ridge adapted to form a proximal seal. The recessed area can be located in the center of the second ridge and extend not only into the second ridge, but also into the planar surface.

A method of sealing a bottom fin of a gabled carton having a bottom gabled portion from which the bottom fin extends includes forming a distal seal, a proximal seal and a relieved area. A distal seal is formed extending lengthwise along the bottom fin and between the bottom gabled portion and an outer edge. A proximal seal is formed extending lengthwise along the bottom fin between the bottom gabled portion and the distal seal. A relieved area is formed on a central portion of the distal seal. The steps of forming the distal seal, the proximal seal, and the relieved area can be performed substantially simultaneously.

Other objects and advantages will become apparent upon reference to the accompanying description when taken in conjunction with the following drawings.

BRIEF DESCRIPTION OF THE DRAWINGS

FIG. 1 illustrates a perspective view of a gable top carton having a bottom gabled portion and bottom fin structure before the fin is folded over for sealing to the carton bottom.

FIG. 2 illustrates a sectional view taken along line II—II of FIG. 1.

FIG. 5 illustrates a detailed perspective view of the bottom gabled portion of a gable top carton after carton sealing has occurred.

DETAILED DESCRIPTION OF THE PREFERRED EMBODIMENTS

Figure 3:
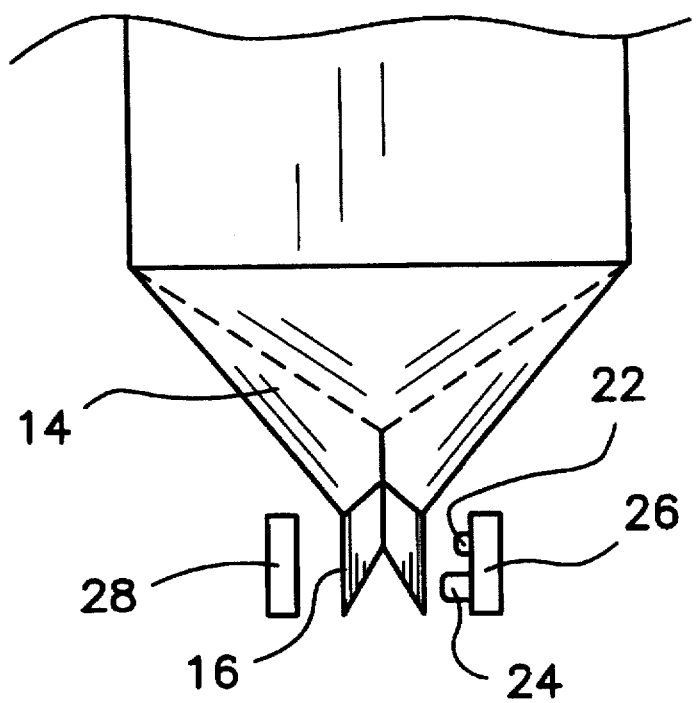
FIG. 3 illustrates a schematic side view of the bottom fin of the gable top carton before the sealing jaws come together to seal the bottom fin.

FIG. 1 illustrates a carton blank 10 for forming a gable top carton. The blank 10 may be formed from any one of a variety of paperboard laminate structures. The blank 10 is divided by a plurality of creases to form a gabled top 12 and a gabled bottom 14. The bottom gable 14 has creases to form a bottom fin 16.

As seen in FIG. 2, when the major flaps 13 and the minor flaps 11 are folded in to form the bottom gable 14, a stress concentration point 15 is formed. The stress concentration point 15 is located at the apex of an inverted pyramid at the bottom of the carton 10. When the bottom fin 16 is folded over in the final folding process, stress at point 15 is frequently so great that seal integrity may be compromised.

A side view is shown in FIG. 3. A first jaw 28 and a second jaw 26 are shown prior to sealing occurring on the bottom fin 16. The FIG. 3 embodiment illustrates the proximal seal 22 is shallower than the distal seal 24.

Figure 4:
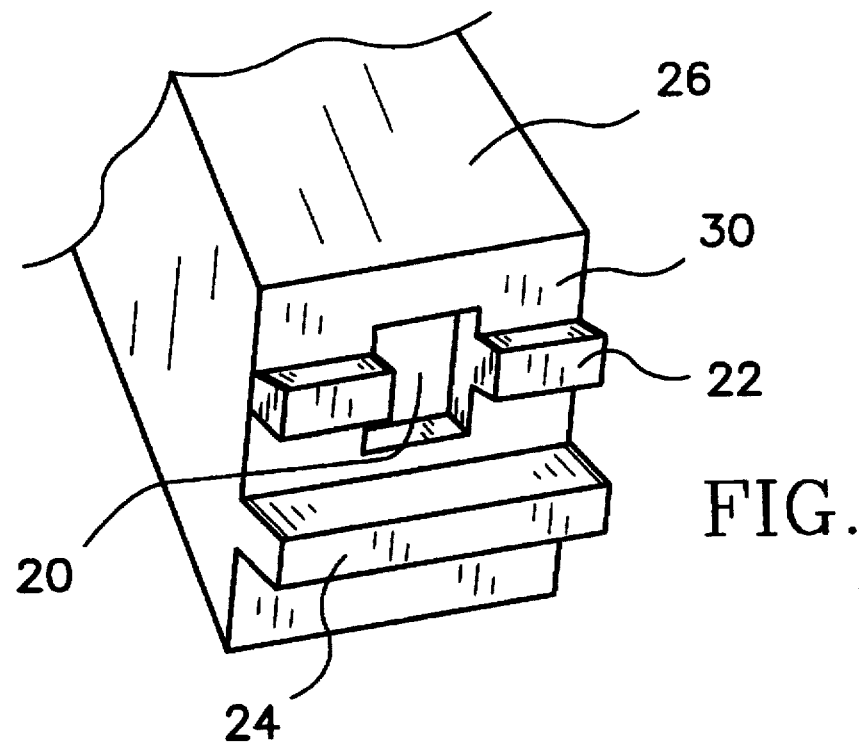
FIG. 4 illustrates a perspective view of the second sealing jaw for sealing the bottom fin.

FIG. 4 shows a perspective view of the second jaw 26. The relieved area 20 is recessed not only into the proximal seal 22 but also into the planar surface 30 of the second jaw 26. The view also shows the proximal seal 22 shallower than the distal seal 24.

FIG. 5 is a perspective view illustrating details of the gabled bottom 14. The bottom fin 16 has a distal seal 24 and a proximal seal 22. The distal seal 24 and the proximal seal 22 extend lengthwise along the bottom gabled portion 14 and the outer edge 18. The relieved area 20 relieves stress at the stress concentration point 15 and thus prevents the carton bottom from leaking when the bottom fin 16 is folded over and sealed to the bottom of the carton.

Although the present invention has been described with reference to a specific embodiment, those of skill in the art will recognize that changes may be made thereto without departing from the scope and spirit of the invention as set forth in the appended claims.

I claim as my invention:

1. A device for sealing a bottom fin of a container, the bottom fin having a seal integrity capable of being compromised at a stress concentration point generally located in the center of the bottom fin, the device comprising:

a first jaw having a first generally planar surface;

a second jaw having a second generally planar surface facing the first generally planar surface; and a first ridge and a second ridge protruding from the second generally planar surface, the first ridge having a predetermined length, the second ridge having a predetermined length less than that of the first ridge, the second ridge spaced apart a predetermined distance from the first ridge and having a recessed area located at a midpoint on the second ridge, the recessed area extending into the second generally planar surface;

whereby the recessed area is adapted and constructed to form a relieved area at the stress concentration point on the bottom fin of the container in order to reduce the susceptibility of the bottom fin to leakage of the contents of the container.

2. A device for sealing a bottom fin of a container as claimed in claim 1 wherein the first ridge is adapted to form a first seal;

the second ridge is adapted to form a crease; and the recessed area is in the center of the second ridge.

* * * * *